(12) United States Patent
Bahr et al.

(10) Patent No.: US 8,210,340 B1
(45) Date of Patent: Jul. 3, 2012

(54) SYSTEM TO SINGULATE AND SORT BULK ARTICLES INTO A SINGLE STREAM

(75) Inventors: Timothy Bahr, Brooklyn Park, MN (US); Melford Bahr, Corcoran, MN (US)

(73) Assignee: MGS Machine Corporation, Maple Grove, MN (US)

( * ) Notice: Subject to any disclaimer, the term of this patent is extended or adjusted under 35 U.S.C. 154(b) by 166 days.

(21) Appl. No.: 12/793,874

(22) Filed: Jun. 4, 2010

Related U.S. Application Data

(60) Provisional application No. 61/223,768, filed on Jul. 8, 2009.

(51) Int. Cl.
*B65G 47/12* (2006.01)

(52) U.S. Cl. ........ 198/453; 198/452; 198/454; 198/416; 198/407

(58) Field of Classification Search .......... 198/452–455, 198/400, 407, 603, 416
See application file for complete search history.

(56) References Cited

U.S. PATENT DOCUMENTS

| | | | |
|---|---|---|---|
| 2,787,358 A * | 4/1957 | Cox | 198/453 |
| 2,824,665 A * | 2/1958 | Lamouria | 221/179 |
| 3,425,530 A * | 2/1969 | Carter | 198/396 |
| 4,044,897 A | 8/1977 | Maxted | |
| 4,401,207 A * | 8/1983 | Garvey | 198/580 |
| 4,530,430 A | 7/1985 | Peterlini | |
| 4,720,006 A | 1/1988 | Lenherr | |
| 4,889,224 A | 12/1989 | Denker | |
| 4,974,719 A | 12/1990 | Chenevard | |
| RE33,511 E | 1/1991 | Treiber | |
| 5,240,101 A | 8/1993 | LeMay et al. | |
| 5,267,638 A | 12/1993 | Doane | |
| 5,372,238 A | 12/1994 | Bonnet | |
| 5,400,896 A | 3/1995 | Loomer | |
| 5,435,433 A | 7/1995 | Jordan et al. | |
| 5,501,315 A | 3/1996 | Loomer | |
| 5,673,783 A | 10/1997 | Radant et al. | |
| 5,701,989 A | 12/1997 | Boone et al. | |
| 5,769,204 A * | 6/1998 | Okada et al. | 198/443 |
| 5,782,332 A | 7/1998 | Guidetti et al. | |
| 5,788,053 A * | 8/1998 | Glawitsch | 198/453 |
| 5,871,080 A | 2/1999 | Manzi et al. | |
| 5,964,340 A | 10/1999 | Dolan | |
| 5,967,296 A | 10/1999 | Dolan | |
| 6,591,977 B2 | 7/2003 | Spencer et al. | |
| 6,622,847 B2 | 9/2003 | Schuitema et al. | |
| 6,648,124 B1 | 11/2003 | Garvey | |
| 6,698,581 B2 | 3/2004 | Steeber et al. | |

(Continued)

*Primary Examiner* — Mark A Deuble
(74) *Attorney, Agent, or Firm* — Elizabeth D. Lewen; Sherrill Law Offices, PLLC

(57) ABSTRACT

A conveyor system to singulate and sort bulk articles. The system comprises a first counter-current conveyor belt with a first machine direction, a second counter-current conveyor belt with a second machine direction and a transverse width, a first guide means, and a second guide means. The first counter-current conveyor belt slopes upward in the first machine direction relative to the second conveyor belt. The second counter-current conveyor belt slopes downward in a transverse direction away from the first conveyor belt. The first guide means urges articles conveyed on the first conveyor belt onto the second conveyor belt. The second guide means is along the second machine direction of the second conveyor belt and urges articles on the second conveyor belt toward the first conveyor belt until the transverse width of the second conveyor belt between an inside edge of the second conveyor belt and the second guide means is less than twice a minor horizontal dimension of the article being conveyed when in a stable rest position.

10 Claims, 5 Drawing Sheets

U.S. PATENT DOCUMENTS

| | | | |
|---|---|---|---|
| 7,222,718 B2 * | 5/2007 | Tarlton | 198/445 |
| 7,322,459 B2 | 1/2008 | Garvey | |
| 2005/0269186 A1 * | 12/2005 | Yoda | 198/455 |

* cited by examiner

SYSTEM TO SINGULATE AND SORT BULK ARTICLES INTO A SINGLE STREAM

This application claims the benefit of U.S. Provisional Application No. 61/223,768, filed Jul. 8, 2009.

BACKGROUND

In manufacturing and distribution facilities many articles come in bulk and need sorted and singulated for input into downstream assembly and packaging equipment. Vibratory, centrifugal, and smart belt systems are often used to sort and orient the bulk articles into single file line for downstream equipment.

The current methods have many limitations, such as, noise, slow speed, high cost, and high rate of damage to sorted articles. The current systems have the additional limitations in the amount of floor space used and difficulty in handling a large variation of article sizes within the same system.

Therefore, a need exists for a system that is simple, compact, and high speed to allow for singulation and sorting of articles of varying size and minimal damage to the sorted articles.

SUMMARY OF THE INVENTION

A first embodiment of the invention is a conveyor system to singulate and sort bulk articles. The system comprises a first counter-current conveyor belt with a first machine direction, a second counter-current conveyor belt with a second machine direction and a transverse width, a first guide means, and a second guide means. The first counter-current conveyor belt slopes upward in the first machine direction relative to the second conveyor belt. The second counter-current conveyor belt slopes downward in a transverse direction away from the first conveyor belt. The first guide means urges articles conveyed on the first conveyor belt onto the second conveyor belt. The second guide means is along the second machine direction of the second conveyor belt and urges articles on the second conveyor belt toward the first conveyor belt until the transverse width of the second conveyor belt between an inside edge of the second conveyor belt and the second guide means is less than twice a minor horizontal dimension of the article being conveyed when in a stable rest position.

A second embodiment of the invention is a conveyor system to singulate and sort bulk articles. The system comprises a first counter-current conveyor belt, a second counter-current conveyor belt, a first guide means, and a second guide means. The second counter-current conveyor belt has a transverse width and slopes upward relative to the first conveyor belt in a machine direction and downward in a transverse direction away from the first conveyor belt. The first guide means urges articles conveyed on the first conveyor belt onto the second conveyor belt. The second guide means is along the machine direction of the second conveyor belt and urges articles on the second conveyor belt toward the first conveyor belt until the transverse width of the second conveyor belt between an inside edge of the second conveyor belt and the second guide means is less than twice a minor horizontal dimension of the article being conveyed when in a stable rest position.

DETAILED DESCRIPTION OF A PREFERRED EMBODIMENT

Nomenclature

| | |
|---|---|
| 10 | Conveyor System |
| 20 | First Conveyor Belt |
| 21 | Distal end |
| 22 | Proximal end |
| 23 | Inside edge |
| 24 | Outside edge |
| 25 | First Machine Direction |
| 26 | Rail |
| 30 | Second Conveyor Belt |
| 31 | Distal end |
| 32 | Proximal end |
| 33 | Inside edge |
| 35 | Second Machine Direction |
| 36 | Transverse Width |
| 37 | Discharge Point |
| 40 | First Guide Means |
| 50 | Second Guide Means |
| 60 | Article Bulk Feed System |
| 70 | Bridge |
| 100 | Articles |
| 101 | Minor Horizontal Dimension |
| Z | Transverse Direction |

Construction

The conveyor system 10 may be used to singulate and sort bulk articles 100 into a single stream of product all flowing in the same direction. The conveyor system 10 may be used with any type of bulk article 100 needing to be singulated. Typical bulk articles 100 needing singulated are pouched items, small tubes of cream, applicators, syringes, or ammunition that is primarily rectangular and/or tubular in size.

Figure 1:
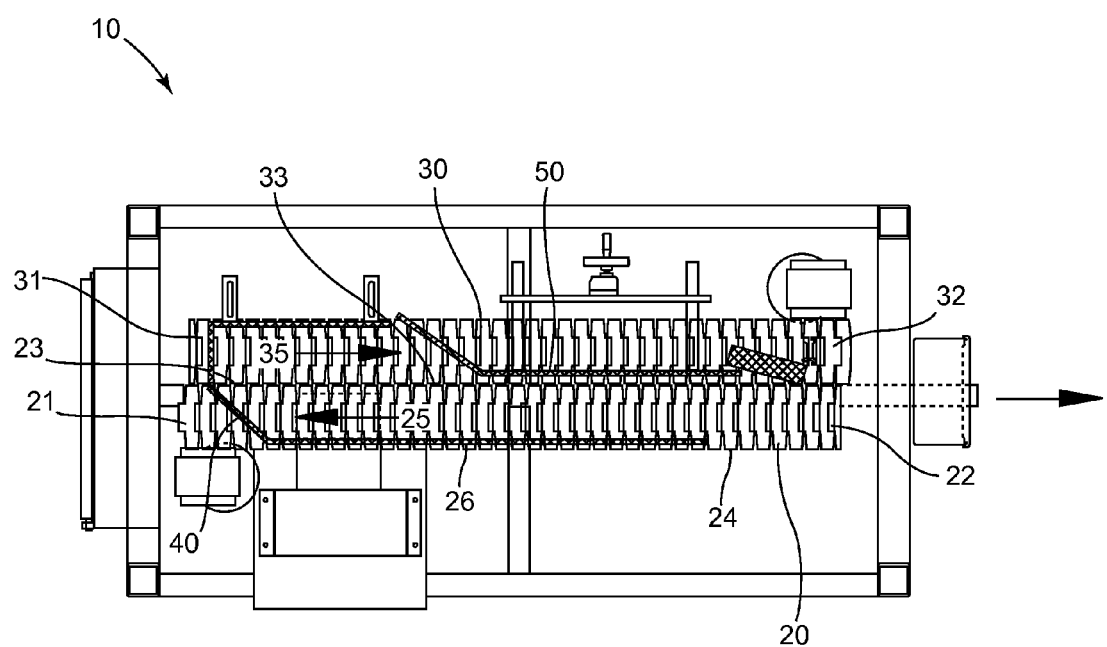
FIG. 1 is a plan perspective view of one embodiment of the conveyor system.
Figure 2:
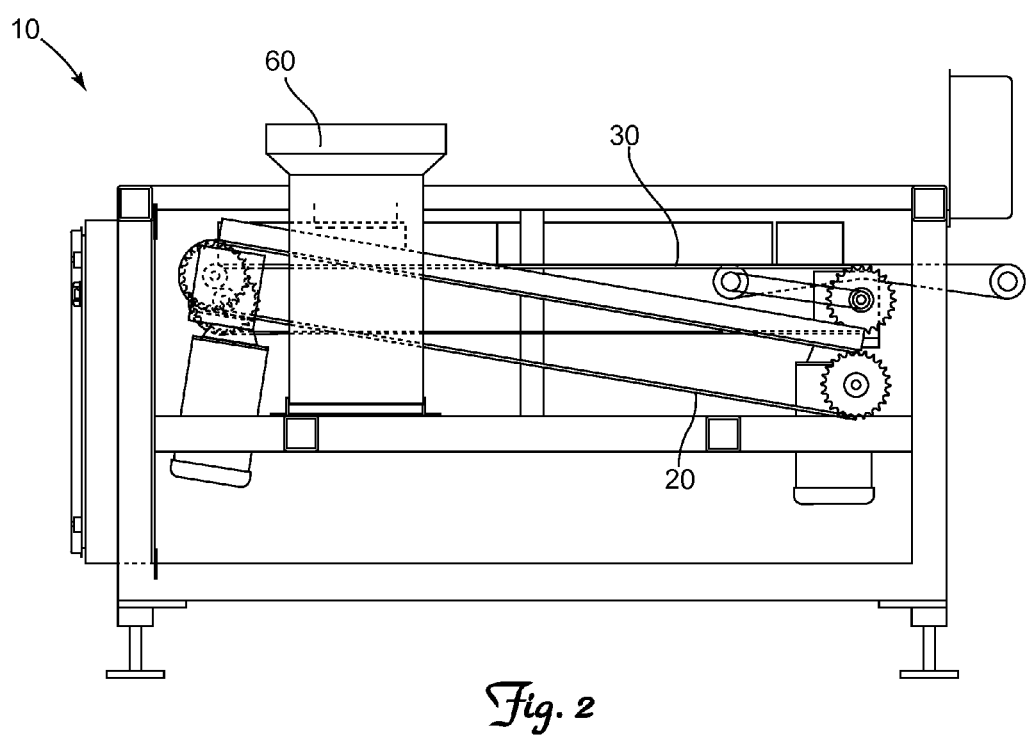
FIG. 2 is an elevation perspective view of the system in FIG. 1.
Figure 3:
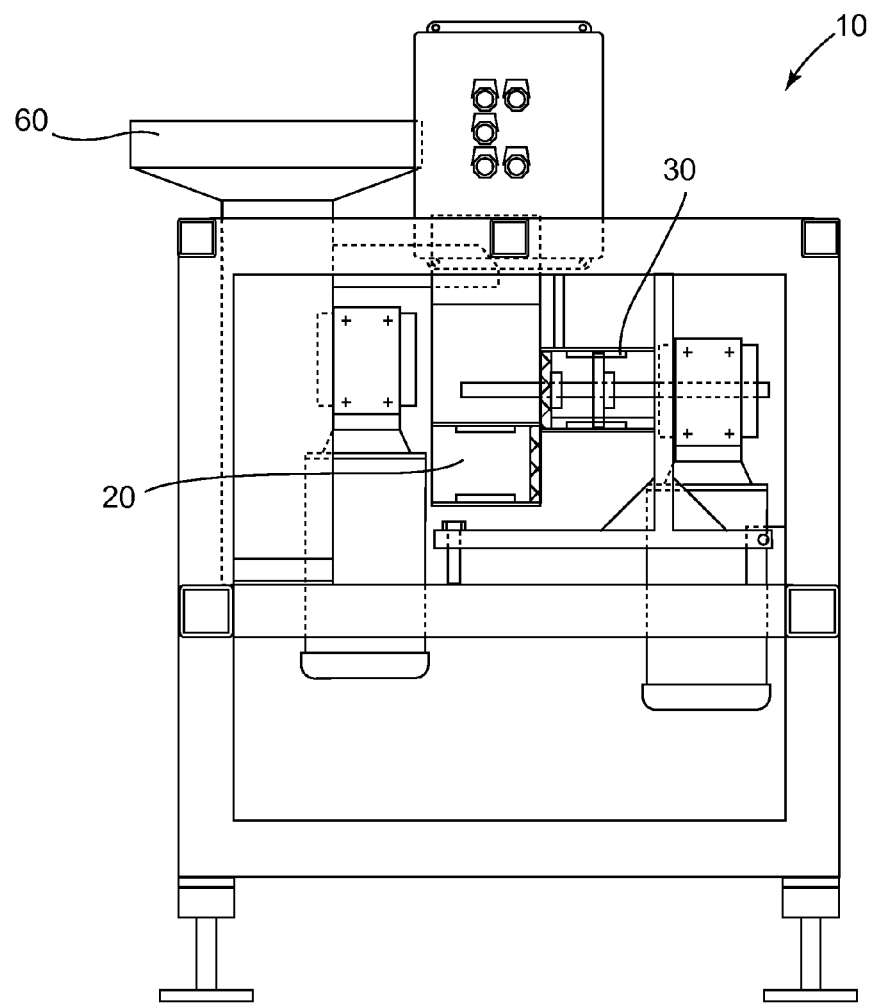
FIG. 3 is an end elevation perspective view of the system in FIG. 1.

As shown in FIGS. 1-3, one embodiment of the system 10 comprises a first counter-current conveyor belt 20, a second counter-current conveyor belt 30, a first guide means 40, and a second guide means 50.

The first counter-current conveyor belt 20 is preferably an endless conveyor belt. Most preferably the first conveyor belt 20 is a high friction conveyor belt. These types of conveyor belts are well-known in the industry. The first conveyor belt 20 flows in the first machine direction 25. As shown in FIG. 2, in the first embodiment of the system, the first counter-current conveyor belt 20 is preferably configured and arranged to slope upward relative to the second conveyor belt 30 in the first machine direction 25. Preferably the first conveyor belt 20 has a rail 26 along the outside edge 24 to prevent articles 100 from falling off of the outside edge 24 of the first conveyor belt 20.

Figure 4:
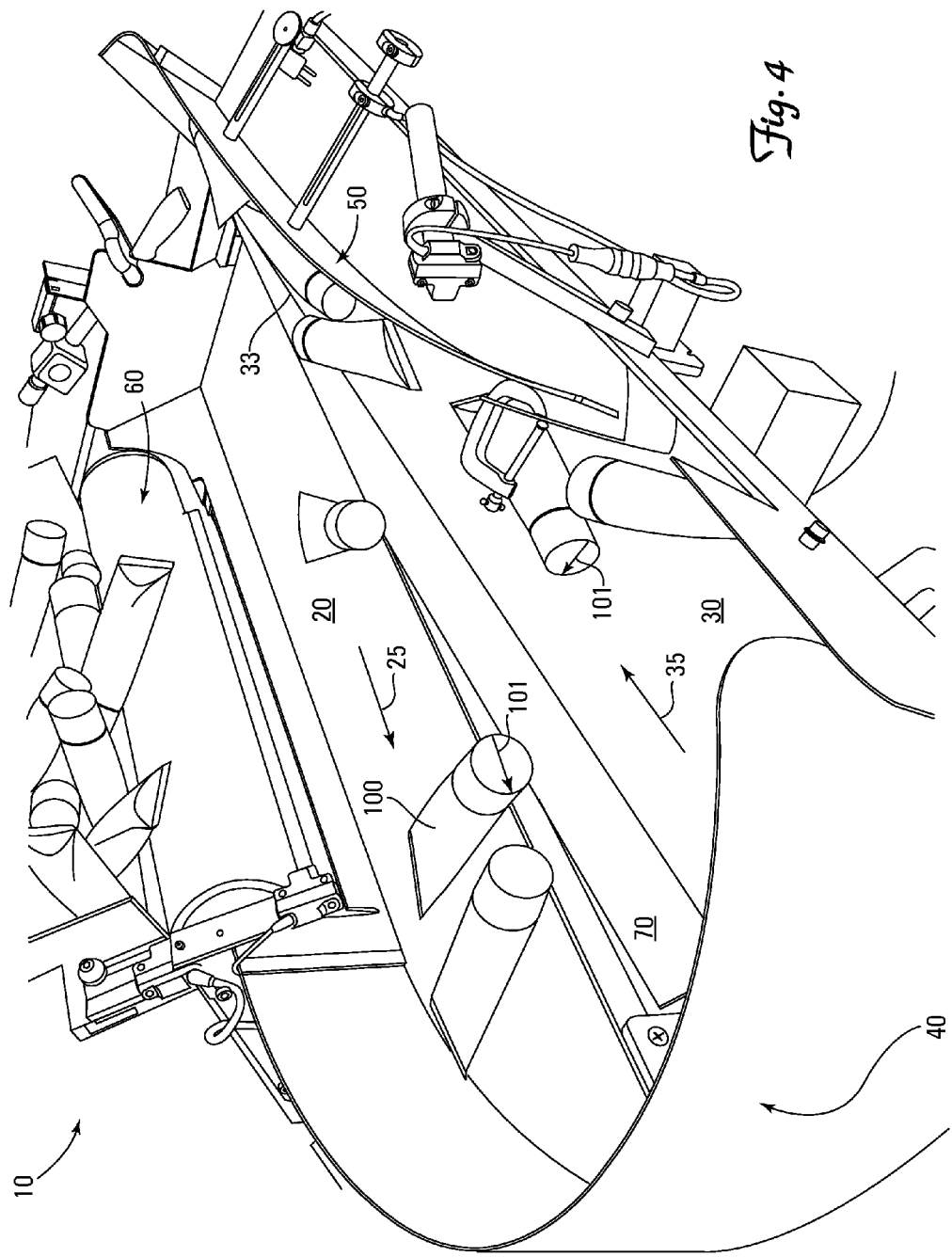
FIG. 4 is a side perspective view of another embodiment of the conveyor system with articles being singulated.
Figure 5:
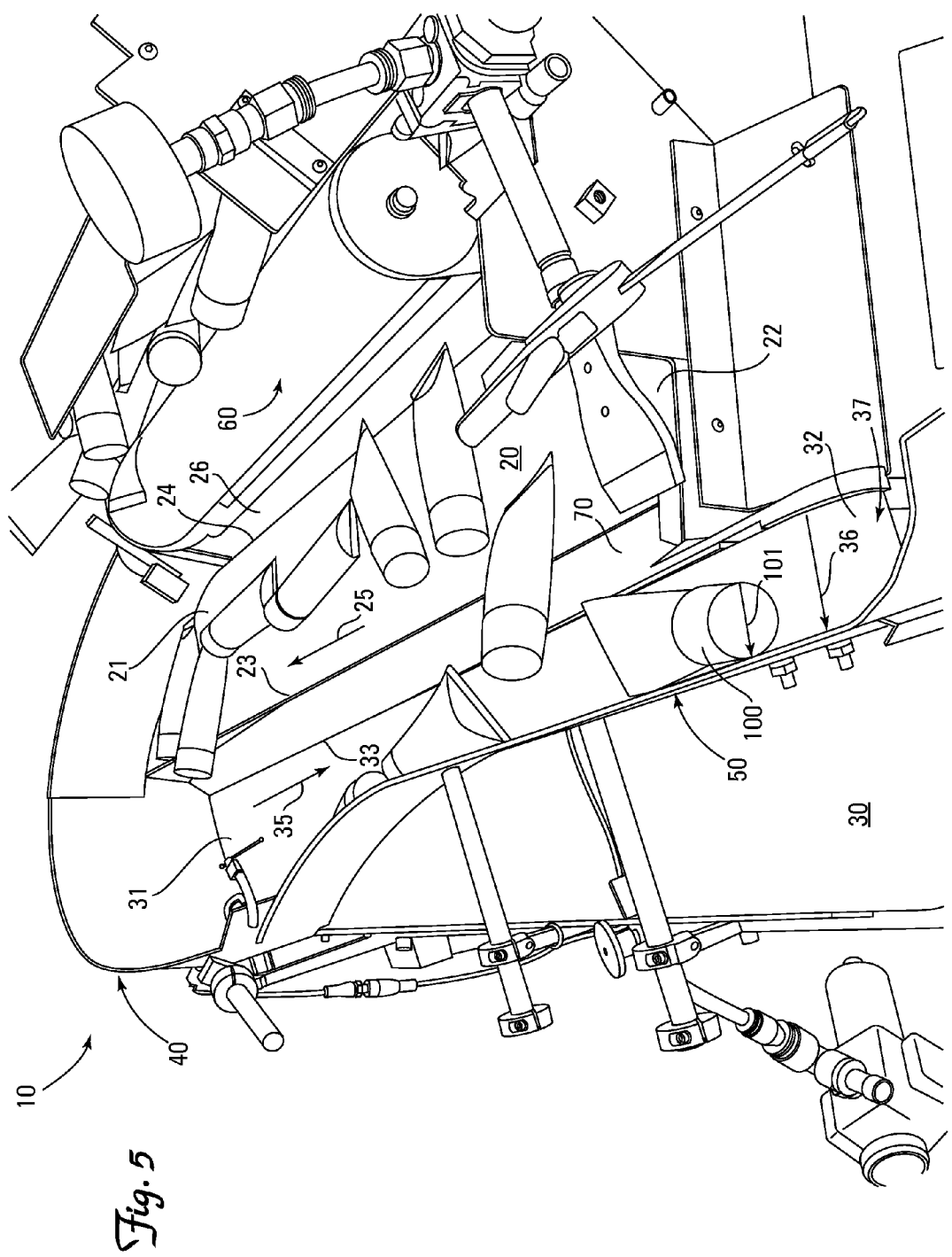
FIG. 5 is an end perspective view of the conveyor system in FIG. 4.

The second conveyor belt 30 runs in the second machine direction 35. The second conveyor belt 30 is also preferably an endless conveyor belt. Most preferably the second conveyor belt 30 is a high friction conveyor belt. As shown in FIGS. 2 and 4, preferably the second conveyor belt 30 is placed adjacent the first conveyor belt 20. The inside edge 33 of the second conveyor belt 30 may be placed as close as possible to the inside edge 23 of the first conveyor belt 20 to minimize any transverse Z gap (not shown) between the first belt 20 and the second belt 30. As shown in FIGS. 4 and 5, if a transverse Z gap is present between the inside edge 23 of the first conveyor belt 20 and the inside edge 33 of the second conveyor belt 30 a bridge 70 may be inserted into or over the gap to prevent articles 100 from falling off of the conveyor system 10 and between the first belt 20 and the second belt 30. The bridge 70 may be made from any suitable bridging material such as wood, plastic, fiber netting, or metal. The preferred material is a smooth metal.

As shown in FIG. 2, in the first embodiment of the system 10, the second conveyor belt 30 is preferably substantially parallel to the ground (not numbered). As shown in FIGS. 2 and 3 at least the inside edge 33 of the proximal end 32 of the second conveyor belt 30 is preferably higher than the proximal end 22 of the first conveyor belt 20. The entire distal end 31 of the second conveyor belt 30 is preferably lower than the distal end 21 of the first conveyor belt 20.

Preferably, the second conveyor belt 30 is configured and arranged to slope downward in a transverse direction Z away from the first conveyor belt 20. Having the second conveyor belt slope downward in a transverse direction Z away from the first conveyor belt 20 may help in singulating and orienting the articles 100 using the article's 100 shape, size, and center of gravity. The first conveyor belt 20 may also be sloped in the transverse direction Z to help in singulating and orienting the articles 100.

As shown in FIGS. 4 and 5, in a second embodiment of the system the second conveyor belt 30 slopes upward in the second machine direction 35 relative to the first conveyor belt 20. The first conveyor belt 20 is substantially parallel to the ground in the first machine direction 25. Again the second conveyor belt 30 may also be configured and arranged to slope downward in a transverse direction Z away from the first conveyor belt 20.

Depending on the environment in which the conveyor system 10 is utilized and the types of articles 100 to be singulated, both the first conveyor belt 20 and the second conveyor belt 30 may be angled relative to the ground as long as the inside edge 33 of the proximal end 32 of the second conveyor belt 30 is higher than the proximal end 22 of the first conveyor belt 20 and the entire distal end 31 of the second conveyor belt 30 is lower than the distal end 21 of the first conveyor belt 20.

As shown in FIGS. 1 and 5, a first guide means 40 urges articles 100 conveyed on the first conveyor belt 20 onto the second conveyor belt 30 proximate the distal ends 21, 31 of the first belt 20 and the second belt 30. The first guide means 40 may be any known suitable means, such as, a guide, stop, rail, cam, ram, vertically oriented conveyor belt, pivoting gate or brush, or waterfall. To achieve the waterfall the first conveyor belt 20 may slope upward relative to the second conveyor belt 30 in the first machine direction 25 and downward in the transverse direction Z toward the second convey belt 30. As shown in FIGS. 4 and 5, the preferred first guide means 40 is a guide curved across the distal ends 21, 31 of the first conveyor belt 20 and the second conveyor belt 30.

As shown in FIGS. 1, 4 and 5, a second guide means 50 along the second machine direction 35 of the second conveyor belt 30 urges articles 100 on the second conveyor belt 30 toward the first conveyor belt 20 until the transverse Z width 36 of the second conveyor belt 30 between the inside edge 33 of the second conveyor belt 30 and the second guide means 50 is less than twice a minor horizontal dimension 101 of the article 100 being conveyed when in a stable rest position at or near the discharge point 37 from the second conveyor belt 30. As shown in FIGS. 1 and 5, restricting the transverse Z width 36 of the second conveyor belt 30 between the inside edge 33 of the second conveyor belt 30 and the second guide means 50 to less than twice the minor horizontal dimension 101 of the article 100 being conveyed reduces the likelihood of more than one article 100 entering the discharge point 37 at one time, hence insuring singulation. For articles 100 with more than a 1:1 aspect ratio the restriction may also help to properly orient the articles 100 before being discharged from the second conveyor belt 30.

The second guide means 50 may be any known suitable means such as a guide, stop, rail, cam, ram, or vertically oriented conveyor belt. As shown in FIGS. 1, 4 and 5, the preferred second guide means 50 is a rail. Most preferably the second guide means 50 is adjustable transversely Z to allow the conveyor system 10 to singulate and sort different sized articles 100.

The conveyor system 10 may also have an article bulk feed system 60 configured and arranged to deposit the bulk article 100 onto the first conveyor belt 20. The system 10 may be used with any type of bulk feeding systems, such as vibratory bins, bulk feed conveyors, and elevating cleated conveyors. The preferred article bulk feed system 60 is a bulk feed conveyor.

Use

As shown in FIGS. 4 and 5, the conveyor system 10 may be used to singulate bulk articles 100. The bulk articles 100 are preferably deposited onto the first conveyor belt 20 at a speed slower than the belt speed of the first conveyor belt 20 to prevent an overload of the system 10. The bulk articles 100 may be deposited on the first conveyor belt 20 by an article bulk feed system 60 such as a bulk feed conveyor belt or even placed by hand. Once the bulk articles 100 are on the first conveyor belt 20 they come to rest in a stable position (no motion relative to the first conveyor belt 20). As shown in FIG. 4, the article 100 is in a stable rest position when lying horizontally (not on its cap or its end). As the articles 100 approach the first guide means 40 they are randomly oriented and bunched together on the first conveyor belt 20. As the articles 100 come into contact with the first guide means 40 they are urged onto the second convey belt 30 proximate the distal end 31 of the second conveyor belt 30. Having the distal end 31 of the second conveyor belt 30 lower than the distal end 21 of the first conveyor belt 20 aids the first guide means 40 in urging the articles 100 onto the second conveyor belt 30.

The articles 100 then travel along the second conveyor belt 30 in the second machine direction 35. As the articles 100 travel in the second machine direction 35 the second guide means 50 urges the articles 100 back toward the first conveyor belt 20.

Near the discharge point 37 on the second conveyor belt 30, the second guide means 50 reduces the transverse Z width 36 of the second conveyor belt 30 between the inside edge 33 of the second conveyor belt 30 and the second guide means 50 to less than twice the minor horizontal dimension 101 of the article 100 being conveyed. Reducing the transverse Z width 36 of the second conveyor belt 30 at or near the discharge point 37 may prevent more than one article 100 at a time from being discharged from the second conveyor belt 30 and help to urge the non singulated or improperly oriented articles 100 onto the first conveyor belt 20 for recirculation. It may also help orient articles 100 that have a length greater than their width as the articles 100 are urged back onto the first conveyor belt 20. Having the inside edge 33 of the proximal end 32 of the second conveyor belt 30 higher than the proximal end 22 of the first conveyor belt 20 may allow excess or mis-oriented articles 100 traveling on the second conveyor belt 30 to fall back on the first conveyor belt 20 for recirculation through the system 10 as the transverse Z width 36 of the second conveyor belt 30 is reduced by the second guide means 50.

As the articles 100 travel along the second conveyor belt 30 in the second machine direction 35 they are urged toward the first conveyor belt 20. If any part of the article 100 comes into contact with the first conveyor belt 20 due to improper orientation or non-singulation, the article 100 will be urged back onto the first conveyor belt 20 and conveyed through the system 10 again until properly oriented and singulated to travel through the discharge point 37.

We claim:

1. A conveyor system to singulate and sort bulk articles, comprising:
   (a) a first counter-current conveyor belt with a first machine direction;
   (b) a second counter-current conveyor belt with a second machine direction and a transverse width wherein the second conveyor belt slopes downward in a transverse direction away from the first conveyor belt and the first conveyor belt slopes upward in the first machine direction relative to the second conveyor belt;
   (c) a first guide means for urging articles conveyed on the first conveyor belt onto the second conveyor belt; and
   (d) a second guide means along the second machine direction of the second conveyor belt for urging articles on the second conveyor belt toward the first conveyor belt until the transverse width of the second conveyor belt between an inside edge of the second conveyor belt and the second guide means is less than twice a minor horizontal dimension of the article being conveyed when in a stable rest position.

2. The conveyor system to singulate and sort bulk articles as recited in claim 1, further comprising an article bulk feed system configured and arranged to discharge articles onto the first conveyor belt.

3. The conveyor system to singulate and sort bulk articles as recited in claim 2, wherein the article bulk feed system is a bulk feed conveyor belt.

4. The conveyor system to singulate and sort bulk articles as recited in claim 1, wherein the first guide means is a cam.

5. The conveyor system to singulate and sort bulk articles as recited in claim 1, wherein the second guide means is a rail.

6. The conveyor system to singulate and sort bulk articles as recited in claim 1, wherein the first guide means is a rail.

7. The conveyor system to singulate and sort bulk articles as recited in claim 1, wherein the second guide means is a conveyor belt.

8. The conveyor system to singulate and sort bulk articles as recited in claim 1, wherein the first guide means is a stop.

9. The conveyor system to singulate and sort bulk article as recited in claim 1, wherein the second guide means is transversely adjustable.

10. A conveyor system to singulate and sort bulk articles, comprising:
    (a) a first counter-current conveyor belt;
    (b) a second counter-current conveyor belt having transverse width wherein the second conveyor belt slopes upward relative to the first conveyor belt in a machine direction and downward in a transverse direction away from the first conveyor belt;
    (c) a first guide means for urging articles conveyed on the first conveyor belt onto the second conveyor belt; and
    (d) a second guide means along the machine direction of the second conveyor belt for urging articles on the second conveyor belt toward the first conveyor belt until the transverse width of the second conveyor belt between an inside edge of the second conveyor belt and the second guide means is less than twice a minor horizontal dimension of the article being conveyed when in a stable rest position.

* * * * *